D. S. DE LAVAUD.
TOPOGRAPHIC RECORDER.
APPLICATION FILED AUG. 27, 1920.
1,427,267.
Patented Aug. 29, 1922.
3 SHEETS—SHEET 1.
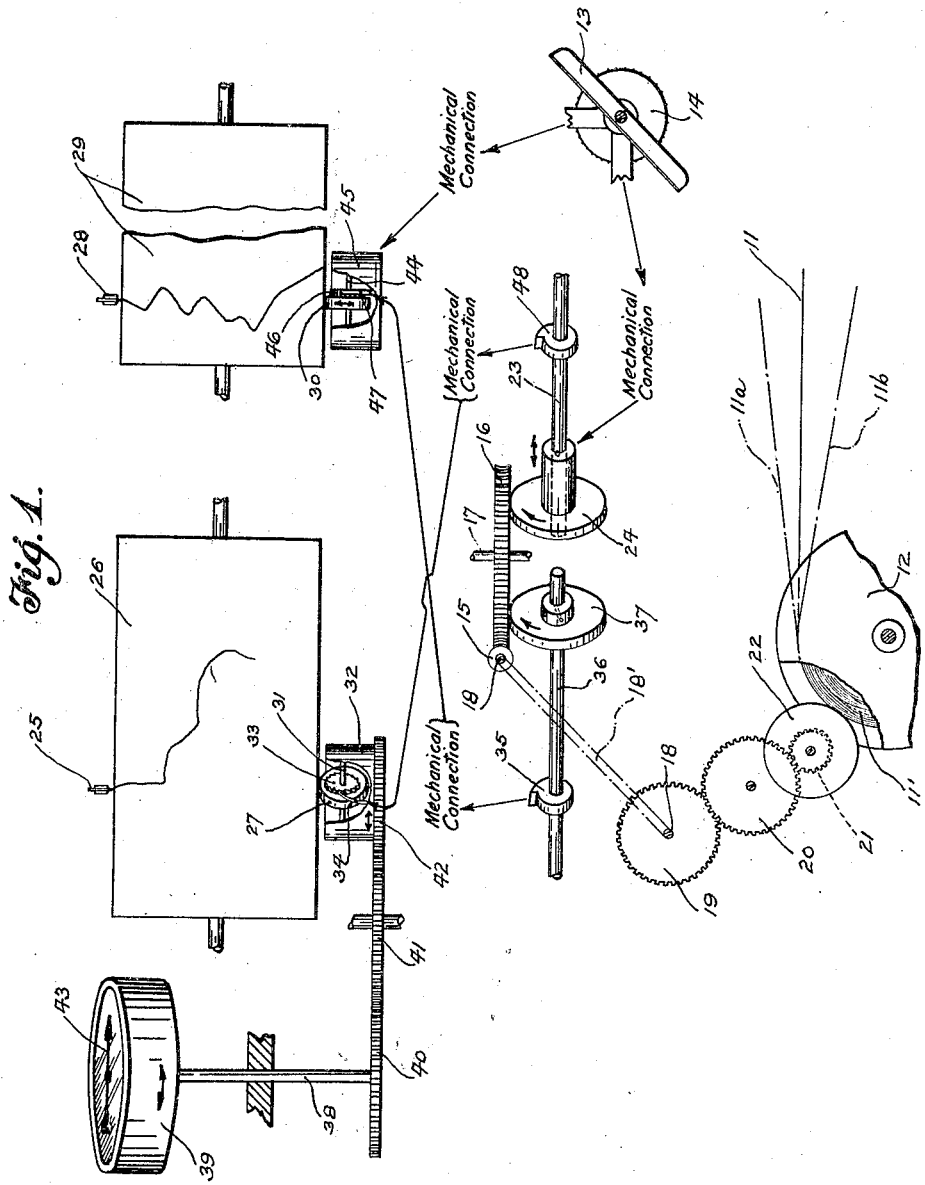
INVENTOR:
Dimitri Sensaud de Lavaud,
BY Augustus M. Henry
ATTORNEYS.

D. S. DE LAVAUD.
TOPOGRAPHIC RECORDER.
APPLICATION FILED AUG. 27, 1920.
1,427,267.
Patented Aug. 29, 1922.
3 SHEETS—SHEET 2.
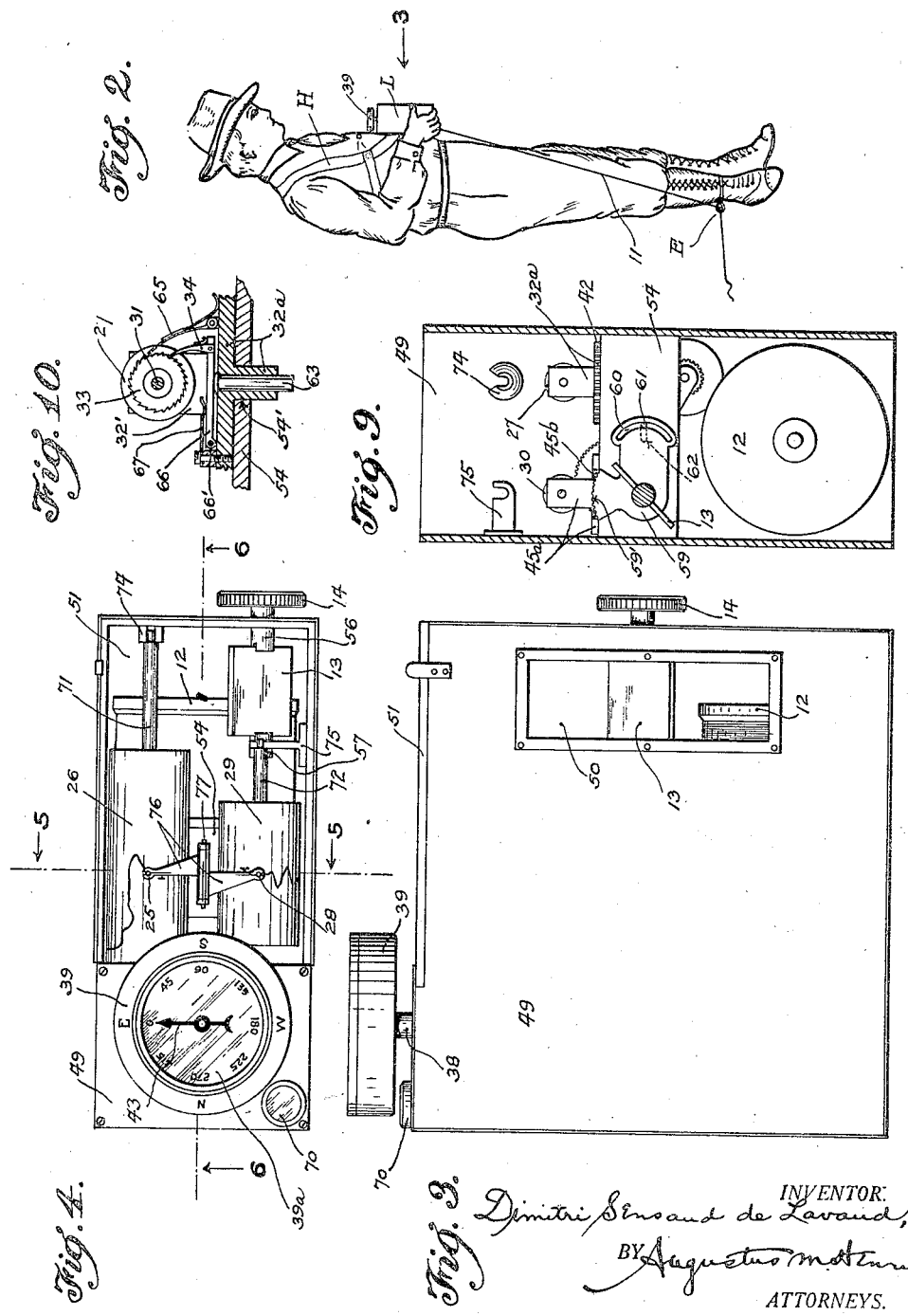
INVENTOR:
Dimitri Sensaud de Lavaud,
BY Augustus M. Henry
ATTORNEYS.

D. S. DE LAVAUD.
TOPOGRAPHIC RECORDER.
APPLICATION FILED AUG. 27, 1920.
1,427,267.
Patented Aug. 29, 1922.
3 SHEETS—SHEET 3.
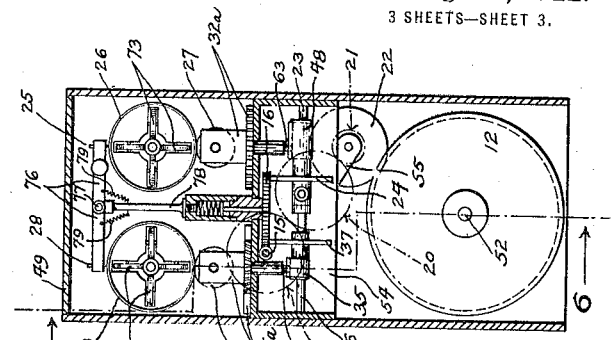
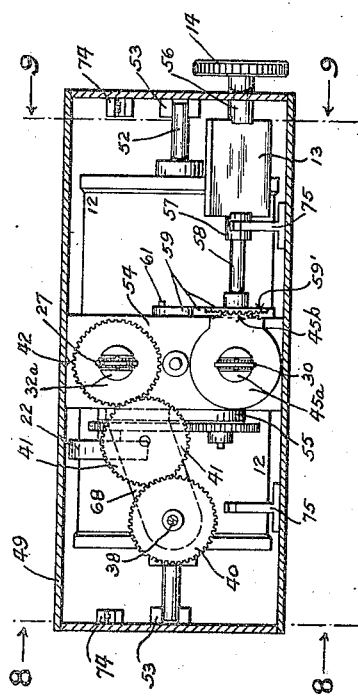
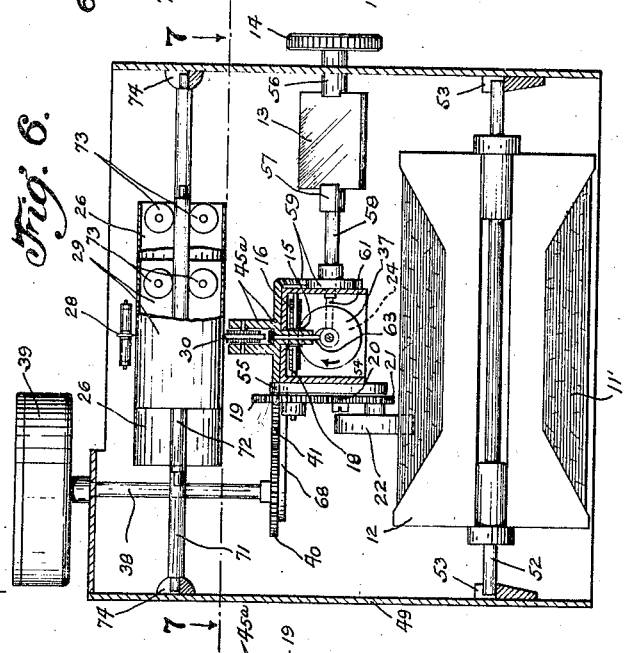
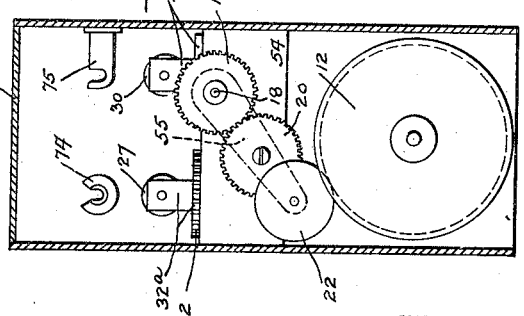
INVENTOR:
Dimitri S Ensaud de Lavaud,
BY Augustus M. Henry
ATTORNEYS.

UNITED STATES PATENT OFFICE.

DIMITRI SENSAUD DE LAVAUD, OF NEW YORK, N. Y.

TOPOGRAPHIC RECORDER.

1,427,267.  Specification of Letters Patent. Patented Aug. 29, 1922.

Application filed August 27, 1920. Serial No. 406,445.

*To all whom it may concern:*

Be it known that I, DIMITRI SENSAUD DE LAVAUD, a citizen of Brazil, and a resident of New York, in the county of New York and State of New York, have invented certain new and useful Improvements in Topographic Recorders, of which the following is a specification.

This invention relates to automatic portable surveying apparatus of the cable and reel operated type. More particularly the invention relates to apparatus of this kind wherein a permanent graphic record of the course surveyed is made as the result of the provision of elevation-measuring means, true-distance measuring means, horizontal-distance measuring means operated by the first two means acting in conjunction, and azimuth-measuring means.

By "true-distance" is meant the actual linear distance of the course surveyed as the course ascends and descends following the profile of the land.

Now, the majority of previous surveying instruments of the kind above described have relied on ground wheels for controlling the operation of the true-distance measuring means, but the action of such ground wheels has been unreliable so far as accurate measurements are concerned, and the use of such wheels has really been impracticable where tracts having dense vegetation have had to be surveyed. Consequently, the reel and cable method of actuating the true-distance measuring means has been sought to be used in some instances.

In none of these previous constructions, however, so far as I am aware, has the reel and cable means been used entirely independently of the elevation measuring means, or in such a way that the paying out of the cable fails to defeat accurate operation of the elevation measuring means, or in an apparatus where a pendulous weight, and hence a finely adjusted level of the entire instrument, has not been attempted to be relied on.

An important feature of the present invention is the provision of an automatic surveying instrument in which the reel and cable means is used exclusively for controlling the distance measuring means, and a completely independent elevation measuring means is employed which is automatic in its accurate action relative to both the map record and the profile record, as the result of manual adjustments of a tiltable mirror preferably forming the angularly adjustable, light-ray-bending, elevation-measurement controller essential to the present invention.

Another feature of the present invention is an accurate, simple, light, rugged and entirely mechanical construction of the preferred embodiment, capable of being housed in one single small casing wherein the various mechanisms may operate correctly even with the instrument out of level.

Very many other objects and advantages of the invention and of the present preferred embodiment thereof will be seen, and the invention itself and said embodiment will be more fully understood, from the following description of the structural details of said embodiment as illustrated in the accompanying drawings, of which—

Fig. 1 is a schematic view showing the main working parts of the instrument, certain operative connections being merely indicated;

Fig. 2 is a side elevation showing the instrument on a body harness arranged on a single porter;

Fig. 3 is a front elevation of the instrument, that is, a view thereof showing the same when observed pursuant to the arrow 3 of Fig. 2;

Fig. 4 is a top plan view of the instrument;

Fig. 5 is a vertical transverse section taken approximately on the line 5—5 of Fig. 4, showing certain of the parts in elevation;

Fig. 6 is a vertical longitudinal section, taken approximately on the lines 6—6 of Figs. 4 and 5;

Fig. 7 is a horizontal section, taken on the line 7—7 of Fig. 6;

Fig. 8 is a vertical transverse section, taken on the line 8—8 of Fig. 7.

Fig. 9 is a vertical transverse section, taken on the line 9—9 of Fig. 7; and

Fig. 10 is an enlarged detail view, showing certain of the parts of Figs. 6 and 7.

Similar reference characters refer to similar parts throughout the several views of the drawings.

Attention is first directed to Fig. 1, which, being diagrammatic, shows the main working parts in non-overlapping relation wherever practicable, to give greater clearance; this end being attained in part by throwing to the right an elevation-recording drum 29, and by throwing to the right, as indicated in dot-and-dash lines at 18′, the part of a shaft 18 beyond a spur-gear 19.

A cable 11 is withdrawn from the instrument by being unwound from a reel 12. The dot-and-dash lines 11ª and 11ᵇ are drawn to indicate that the angle at which the cable is unwound from the reel does not have to be maintained constant in accordance with any predetermination, that is to say, the angle at which the cable is withdrawn from the reel is a matter of indifference so far as automatic operation of the instrument is concerned and does not have anything to do with the means for measuring or recording elevation data.

Here the elevation measuring means is constituted by a pivoted mirror 13, functioning in complete independence of the angle of withdrawal of the cable. The mirror is attached to a thumb-knob 14, for manual adjustment by the porter of the instrument, in accordance with the vertical position, relative to the level of the instrument, of a marker on the back of a porter marching ahead.

The true-distance measuring means is constituted by a worm 15, in turn driving a worm-gear 16 about a vertical axis 17. The worm 15 is fixed on a shaft 18, on which shaft is also fixed a spur-gear 19. Spur-gear 19 meshes with a similar gear 20, and the latter meshes with a spur-pinion 21. Fixed on the shaft of the spur-pinion is a friction-wheel 22, always in contact with the windings 11′ of the cable on the reel 12.

The horizontal-distance measuring means is constituted by a horizontal shaft 23, this shaft having splined thereon a friction-wheel 24, the periphery of which is always in driven contact with the under-surface of worm-gear 16. The under-surface of the worm-gear thus acts as a friction driver for the wheel 24, the two members 16 and 24 always rotating simultaneously. Since the wheel 24, however, is splined on and slidable along the shaft 24, such wheel may be moved closer and closer toward the center of rotation of worm-gear 16 by means of a suitable mechanical connection as indicated, according as mirror 13 is tilted more and more to give increasing elevation angles. Consequently, as the porter carrying the instrument ascends, for instance, a steep hill, the wheel 24 will be very close to the center of rotation of the worm-gear 16, and the shaft 23, the horizontal-distance measuring means, will rotate at an angular velocity very much less than that of worm 15, the true-distance measuring means.

The map-making recording means is shown at the top left of Fig. 1, and includes a fixed stylus 25, a rotatable and slidable drum 26, and a friction wheel 27. This friction wheel is rotatable about its axis, which axis is always horizontal, and also about that diameter of the wheel which at any instant happens to be vertical,—thereby to give the drum rotating, sliding or combined rotating and sliding movements relative to the stylus.

The profile-making recording means is shown at the top right of Fig. 1, and includes a fixed stylus 28, a rotatable and slidable drum 29, and a friction-wheel 30. The friction-wheel 30, likewise, is rotatable about its axis, and also about a diameter thereof,— thereby also to give the drum 29 rotating, sliding or combined rotating and sliding movements relative to the stylus.

Provision is made for rotating the friction-wheel 27, associated with the map-making drum 26, by fixing the friction-wheel on a horizontal shaft 31 journaled in opposite end portions to the side wall of a cylindrical device 32. This shaft 31 has fixed thereon a ratchet 33, acted on by a rising and falling pawl 34. The pawl is thus actuated by means of a suitable mechanical connection as indicated, such connection including in part a cam 48 fixed on the horizontal-distance measuring shaft 23. Now, the two factors of the graph to be inscribed on the map-making drum 26 are the horizontal-distances traversed and the azimuths of the lines of traverse. The former of these two factors is taken care of by the arrangement just described, functioning to rotate the friction-wheel 27 about its axis in agreement with the rotation of the shaft 23 about its axis. The azimuth factor is introduced when required by simultaneously rotating the friction-wheel 27 about its vertical diameter, which diametral rotation is attained by rotating the device 32 about its vertical axis in agreement with the setting of the azimuth-measuring means at the instant when the porter carrying the surveying instrument makes a turn to the right or left.

This azimuth-measuring means is constituted by a vertical shaft 38, carrying fixedly at its upper end a compass-casing 39, and carrying fixedly at its lower end a spur-gear 40 meshing with a spur-gear 41, the latter gear meshing in turn with a spur gear 42 fixed on the bottom of device 32.

Such a compass casing 39 may be of the ordinary commercial construction, that is, containing a compass card (not shown) fixed in the bottom thereof and visible through the usual top transparent pane, the customary north-seeking arrow is shown at 43. It is clear then, that if the compass casing 39 is manually turned, every time the porter carrying the surveying instrument makes a turn to the right or left, thereby always to keep the head of the arrow 43 in registry with a predetermined calibration on the compass card, the device 32 will be rotated, at each change in horizontal-direction along the course, to an extent proportional to the change in azimuth direction.

Provision is made for rotating the friction-wheel 30, associated with the profile-making drum 39, about the wheel axis, by mounting the wheel on a shaft 44 journaled in opposite end portions to the side wall of a cylindrical device 45. Shaft 44 has fixed thereon a ratchet 46, acted on by a rising and falling pawl 47. The pawl is thus actuated by means of a suitable mechanical connection as indicated, such connection including in part a cam 35 fixed on a shaft 36—this cam on the shaft 36 being in effect what may be termed a secondary true-distance measuring means, since the shaft 36 always rotates at a constant speed relative to the speed of the true-distance measuring means constituted by worm 15. This is so, because the shaft 36 has fixed thereon a friction-wheel 37, co-acting always with a certain circumferential line on the under-surface of worm-gear 16. Now, the two factors of the graph to be inscribed on the profile-making drum 29 are the true-distances traversed and the elevations or angles or ascent or descent of the lines of traverse. The former of these two factors is taken care of by the arrangement just described, functioning to rotate friction wheel 30 about its horizontal axis in agreement with the rotation of worm 15. The elevation factor is introduced by rotation of mirror 13, when such mirror is manually adjusted to have a predetermined reflective angle relative to the marker on the back of the porter marching ahead. Thus, any angular movement of the mirror serves, not only to correctly set the true-distance measuring means, the shaft 23, by adjusting friction-wheel 24 relative to the center of rotation of worm gear 16, but also, simultaneously and correctly to rotate the device 45, the latter by means of a suitable mechanical connection as indicated. According to the preferred construction of the instrument, as will be illustrated in connection with the other views of the drawing below described, the mirror is so mounted and arranged that said reflective angle thereof is the one which the mirror must assume to reflect vertically upward the image of the marker on the back of the porter marching ahead.

Attention is called to the fact that both the two distance measuring means are acted on by the rotation of friction wheel 22 in accordance with the rate of rotation of the reel 12, which reel-rotation is controlled by the rate of withdrawal of the cable 11, which withdrawal of the cable 11 is in turn controlled by the distance of portage of the instrument (the free end of the cable having been initially attached to some fixed object on a boundry-point of the field to be surveyed); and, since the periphery of friction wheel 22 is always in contact with and driven by the wound portion 11' of the cable 11, and not the reel 12, the friction wheel 22 is always rotated in proper ratio to the rate of unwinding of the cable 11, despite the fact that as more and more of the cable 11 is unwound the reel 12 will be rotated at a greater and greater angular velocity for each foot of cable withdrawn.

Before taking up the remaining and more detailed structural features of the instrument as disclosed in Figs. 2 to 10, it is pointed out that rocking of the elevation measuring means, the mirror 13, is directly transmitted to the profile-making recording means, and at the same time indirectly transmitted to the map-making recording means; in the first case, to rotate the device 45, for elevation, and in the second case, to adjust the friction wheel 24 relative to the center of rotation of the worm gear 16, for making the required cosine horizontal-distance correction for the map-making recording means controlled by the rotation of friction-wheel 27. In said second case,—that is, the functioning of the mirror 13 relative to the map-making recording means of which the drum 26 is a part,—the rocking of the mirror is preliminarily applied to operate one member (the friction-wheel 24) of a variable gearing, another member (the worm gear 16) of the variable gearing being operated by the true-distance measuring means (the worm 15), whereby horizontal distance measurements are exhibited by the third member of the variable gearing (the shaft 23, the horizontal distance measuring means) for transmission to the map-making recording means, —the three members of the variable gearing being always directly engaged.

Referring now to Fig. 2, a porter is shown ready to take up his surveying march. The instrument is indicated at L, and is conveniently hung in front of the porter's body by means of a suitable harness as indicated at H. For greater accuracy in the graphic results, the cable 11, as shown in Fig. 2, is preferably withdrawn downward almost vertically from its reel, through a suitable aperture (not shown) in the bottom of the instrument casing; the cable being subsequently passed through an eye-device E attached to one of the leggings of the porter near the legging heel, before the cable has its free end attached to some fixed object in the field to be surveyed, at the commencement of a surveying operation. The advantage of this arrangement lies in the fact that the cable is payed out behind the porter of Fig. 2 approximately along the land level, and a very short spike or stake (not shown) may be driven into the ground and used as a guiding anchor for an intermediate portion of the cable when the porter turns to the right or left when marching.

Referring to Figs. 3 and 4, and noting that Fig. 3 shows the side of the instrument which would face an observer looking in the direction of the arrow 3 of Fig. 2, it will be seen that when the instrument is carried by a porter as shown in Fig. 2, the working parts are all housed in a casing 49, with the exception of two projecting parts to be manually operated, to wit, the compass casing 39, and the thumb-knob 14 for tilting the mirror 13. And with the instrument carried by the porter as shown and described, the compass casing is in convenient position for adjustment by the left hand of the porter; the knob 14 is in convenient position for adjustment by the right hand of the porter; the mirror 13 may receive, through a transparent vertical pane 50, an image of the marker on the back of a porter marching ahead; and the reflection of such image will reach the eye of the porter through a horizontal transparent pane 51, which pane also reveals to the eye of the porter the functioning of the map-making drum 26 and of the profile-making drum 29; while also below the eye of the porter are the compass card and arrow inside the compass casing 39.

As shown most clearly in Figs. 5, 6, 7 and 8, the reel 12, having cable windings 11' thereon, is hung loosely on a shaft 52 loose in bearings 53.

Across the casing 49, at about its center, is mounted an inverted U-beam support 54. Housed in this support are worm 15, the latter's worm gear 16, the non-slidable friction wheel 37, the slidable friction wheel 24, the shafts 36 and 23 with which these friction wheels rotate, and cams 35 and 48 on said shafts.

The shaft 18 on which worm 15 is fixed extends beyond support 54, spur-gear 19 being fast on the protruded end of such shaft. Spur-gear 20 and spur-pinion 21 are pivoted on a swing-arm 55 the upper end of which arm is loose on the protruded part of shaft 18. Thus, especially with friction-wheel 22 of considerable bulk and weight as indicated, gravity always maintains said friction-wheel in working contact with the unwound part 11' of cable 11 on reel 12, irrespective of a slight deviation of the case 49 from the vertical and irrespective of the diminishing diameter of the wound portion of the cable on the reel.

As will be recalled, the worm 15, continuously rotated by the train of gears just described, during unwinding of the cable 11, constitutes the true-distance measuring means.

Referring to the elevation-measuring means, the mirror 13, particular attention is now directed to Figs. 4, 5, 6 and 9. The thumb-knob 14 is fast on a shaft-section 56, between which shaft-section and the shaft-section 57 the mirror 13 is tightly clamped. Shaft-section 57 has a reduced portion 58 the extreme free end of which is loosely journaled in a depending wall of support 54 as indicated in Fig. 6.

On shaft-section 58 near the support 54 is a substantially L-shaped frame 59 shown most clearly in Fig. 9.

The horizontal-distance measuring means, the shaft 23, extends lengthwise of the compartment in support 54, and is axially aligned, as shown most clearly in Fig. 5, with shaft 36 fixedly carrying friction-wheel 37. According to the construction of Fig. 5, friction-wheel 24 and cam 48 are rigidly connected and are splined (by suitable key and key-way not shown) on shaft 23. In order to slide these parts 24—48 axially of shaft 23, to change the speed-ratio between worm-gear 16 and friction-wheel 24 in agreement with the cosine correction required by any particular angle of ascent or descent in the course being surveyed, use is made of the L-shaped frame 59 referred to in the preceding paragraph, which frame is provided with a curved slot 60 (Fig. 9) in the free end of its horizontal arm, such slot taking about a pin 61 (Figs. 9, 5, 6 and 7). This pin, which is offset from the parts 24—48 of Fig. 5, also works in a straight slot 62 (Fig. 9) in support 54. The curved slot 60 (Fig. 9) is cut according to a circle having a less radius than the distance between the center of tilt of mirror 13 and the center of the slot, and so, as the mirror 13, the elevation-measuring means, is tilted in either direction away from its normal 45° angle, at which latter angle the course traversed is level with the horizon, the curved slot 60 functions to move the pin from one end toward the other of the straight slot 62. As a result, since the friction-wheel 24 (Fig. 5) is moved closer to the axis of rotation of wheel 16—the underside of which wheel frictionally drives wheel 24 and shaft 23 (the horizontal-distance measuring means)—, the proper cosine correction is made relative to such shaft 23.

Therefore, during portage of the instrument, we have the two shafts 23 and 36 of Fig. 5 rotating simultaneously. However, the two shafts rotate at the same speed only when the line of traverse is horizontal; at other times the shaft 23 rotates at a slower rate than the shaft 36. Cam 35, fixed on shaft 36, of course, rotates always at the same speed as its shaft. And cam 48, splined on shaft 23, likewise of course always rotates at the same speed as its shaft.

Two vertical tappets 63, each lifted once during a complete revolution of the cam 35 or 48 therebelow, are provided, one between each of said cams and the friction-wheel 30 or 27 thereabove, as shown in Figs. 5 and 6.

At each lifting of a tappet 63, the pawl 34 of Fig. 1 rotates the ratchet 33 to the extent of one tooth and similarly rotates the friction-wheel 27 fixed to the ratchet and acting on the map-making drum 26, or the pawl 44 of Fig. 1 rotates the ratchet 46 to the extent of one tooth and similarly rotates the friction-wheel 30 fixed to the ratchet and acting on the profile-making drum 29.

The mechanisms for causing such intermittent fractional rotations of ratchets 33 and 46 are identical and one of such mechanisms is shown in detail and on an enlarged scale in Fig. 10. For the sake of simplicity of disclosure and to avoid confusion in the use of reference characters, assume that this Fig. 10 shows the mechanism operated by a tappet 63 in connection with friction-wheel 27. As was explained in connection with Fig. 1, this friction-wheel is fast on a shaft 31, the opposite end portions of which are journaled in the opposite sides of a cylindrical device, as elementally constructed in Fig. 1 marked 32, and as preferably constructed in Figs. 5 to 10 marked 32$^a$—such opposite sides here being comprised of a pair of parallel upstanding walls one of which is shown as 32' in Fig. 10. The dependent reduced part of the cylindrical device 32$^a$, rotatable about a vertical axis by being loosely set in a circular opening 54' in support 54, is hollow for the reception and guidance of the rising and falling tappet 63. The ratchet 33 is also fast on the shaft 31, being located on the near side of the friction-wheel 27 in Fig. 10—a companion, identical, auxiliary ratchet (not shown in Fig. 10, but shown in Figs. 6 and 7 without reference characters applied) being fixed on the shaft 31 on the far side of the friction-wheel. This latter ratchet is provided to have its teeth co-act in the well-known manner with an anti-back-lash leaf-spring detent-device 65. The upper end of tappet 63 is provided with an enlargement as indicated, always underlying an intermediate portion of a link 66 pivoted to the cylindrical device 32$^a$ at the point 66' so as always to lie below and in the same vertical plane with ratchet 33.

At the swinging end of this link is an upstanding leaf-spring-held pawl, the pawl 34; the link being normally urged downward by a leaf-spring 67.

A mechanism precisely similar to that last described in connection with Fig. 10 is provided in association with the other tappet 63 and the preferred form of cylindrical device 45$^a$ shown in Figs. 5 to 10 and corresponding in function to the elemental cylindrical device 45 of Fig. 1.

So far then, there have been described the structural arrangements of Figs. 3 to 10 for rotating the friction-wheels 27 and 30 about their axes, the first for moving the map-making drum 26 to record horizontal distances, and the second for moving the profile-making drum 29 to record true-distances.

Now to describe the structural arrangements of said Figs. 3 to 10 for rotating the friction-wheels 27 and 30 about their diameters, when required, that is, for rotating the cylindrical devices 32 and 45$^a$ above their vertical axes.

The friction-wheel 27, associated with the map-making drum 26, is rotated about its diameter, by means of the three intermeshing spur-gears 40, 41 and 42, arranged as shown best in Figs. 5, 6 and 7; the gear 42 being fixedly carried by cylindrical device 32$^a$, the gears 41 and 40 being pivotally mounted on a shelf extension 68 offset from support 54, and the gear 40—as shown in Fig. 6—being fixed on the lower end of vertical shaft 38, the azimuth measuring means. This shaft 38 protrudes at this upper portion above the instrument casing 49 and fixedly carries the compass-casing 39 above the roof of casing 49. A top view of such compass casing is shown clearly in Fig. 4, where the compass card fixed in the bottom of the casing and rotatable therewith and with the shaft 38 and gear 40, is indicated at 39$^a$, and the north-seeking arrow is again seen at 43. As already explained, the azimuth factor is imposed on the map-making drum 26, through rotation of the friction-wheel 27 about a diameter thereof, by means of manual rotations of compass casing 39 as the porter carrying the surveying instrument turns to the right or left while traversing a given course.

A suitable spirit or other level 70 is shown in Figs. 3 and 4 near the compass casing.

The friction-wheel 30, associated with the profile-making drum 29, is rotated about its diameter, in order to impose the elevation factor on the profile record, by means of the following arrangements. Referring again to the L-shaped frame 59 shown most clearly in Fig. 9, and secured fast to the shaft-section 58 for rotation with the elevation-measuring mirror 13, such frame also has an upstanding arm 59' terminating in a bevel gear segment 59$^a$. This gear segment 59$^a$ meshes with a similar gear segment 45$^b$ on cylindrical device 45$^a$ (see also Fig. 7). Accordingly, as the knob 14 is manually adjusted, also by the porter carrying the surveying instrument, as he commences an ascent or descent while traversing a given course, the mirror 13 is correspondingly tilted and the cylindrical device 45$^a$ is correspondingly rotated about a vertical axis to rotate the friction-wheel 30 about a diameter of the latter, thereby to impose on the profile record the correct elevation factor.

The record-parchment-carrying drums 26 and 29, as shown best in Figs. 4, 5 and 6, are slidably and rotatably mounted on shafts 71 and 72, by means of radially arranged rollers 73 pivotally housed in the drums as indicated in Figs. 5 and 6. Shaft 71 is loosely, removably hung in bearings 74, and shaft 72 is similarly hung in bearings 75.

The styli 25 and 28, as shown in Figs. 4, 5 and 6, are carried at the outer ends of a pair of oppositely divergent arms 76, pivoted to a common axis at 77 at the upper end of a standard 78 and such arms are resiliently downwardly urged by springs 79.

Operation: Upon portage of the instrument to unwind the cable 11, shaft 12 and friction wheel 22 are rotated, and thereby the worm 15 and the shaft 23 are simultaneously rotated, the first to act as a true-distance measuring means and the second to act as a horizontal-distance measuring means due to the cosine correction of the manually-set tilt of the mirror 13 and the consequent sliding adjustment of the friction-wheel 24 on shaft 23 caused by the curved slot 60 of L-shaped frame 59, which frame rotates with the mirror. The result of this is that the cam 35 is rotated continuously, and consequently the friction-wheel 30 of the profile-making drum 29 is rotated intermittently, to impose true-distance factors on the graph of the profile-making drum, while the cam 48 is rotated continuously, and consequently the friction-wheel 27 of the map-making drum 26 is rotated intermittently, to impose horizontal-distance factors on the graph of the map-making drum. Simultaneously of course, due to the correct tilting of the mirror 13 and the consequent partial rotation of the gear segment 59$^a$ on L-frame 59, the elevation measuring means, the mirror, is rendering complete the operation of the profile-recording means, by rotating the friction-wheel 30 about a diameter thereof, while the azimuth-measuring means, the shaft 38, carrying at its top the compass casing 39 and at its bottom the gear 40, is automatically functioning, in accordance with the manual rotation of said compass casing as required, to render complete the operation of the map-making record means, by rotating the friction-wheel 27 about a diameter thereof.

It is obvious that the map-scale may be conveniently varied by substituting for one or more of the members 19, 20 and 21 (Figs. 5 and 8) a similar member or members having different diameters and speed ratios.

I claim:

1. In a surveying instrument the combination comprising means for measuring distance traversed, means for measuring the azimuth, means for measuring the vertical angle, means for automatically making simultaneously a plurality of records of said measurements at given points of a course, and operating means for the recording means including a reel, a cable wound on the reel and adapted to have its free end attached to an object fixed in the field to be surveyed, and operative connections between the reel and the recording means.

2. A surveying instrument as defined in claim 1, wherein there are provided means, including a hand actuator, for setting the recording means to agree with the orientation of the instrument at any instant, to cause the recording means to record azimuth factors correctly.

3. A surveying instrument as defined in claim 1, wherein there are provided means, including a hand actuator, for setting the recording means to agree with an angle of ascent or descent of the line to be traversed lying ahead of the instrument at any instant, to cause the recording means to record elevation factors correctly, said elevation measuring means being movable relative to the distance measuring means and at the same time being adjustable independently of the angle of withdrawal of the cable from its reel during paying out of the cable.

4. A surveying instrument as defined in claim 1, wherein such elevation measuring means includes an optical member adjustable relative to said distance measuring means.

5. A surveying instrument as defined in claim 4, wherein such member is a pivotally mounted mirror having a reflecting surface adjustable to several positions in each of which such surface is exposed so as to receive the image of an object ahead of the instrument and to reflect such image to the eye of the porter of the instrument.

6. In a surveying instrument, the combination comprising true-distance measuring means, a reel, a coil of cable wound thereon and having a free end whereby the cable may be unwound from the reel to rotate the same, reel-operated means for operating the true-distance measuring means, elevation measuring means free of engagement by the cable and adjustable relative to the reel and to the true-distance measuring means, recording means, and correction means for the true-distance measuring means continuously variously functionable during operation of the true-distance measuring means and actuated by movements of the elevation measuring means relative to the reel and the true-distance measuring means whereby both the true-distance measuring means and the elevation measuring means may variously act in conjunction to obtain a record of the correct horizontal distance surveyed.

7. A surveying instrument as defined in claim 6, wherein operatively associated with said correction means is a horizontal-distance measuring means operatively connected to both the true-distance measuring means and the elevation measuring means.

8. A surveying instrument as defined in claim 7, wherein said true-distance measuring means is a rotatable member, and wherein said actuating means includes a second rotatable member operatively connected to said first rotatable member, and wherein there is provided an adjusting means for varying the speed ratio between said first and second rotatable members and operatively connected to the elevation measuring means, said second rotatable member constituting the horizontal distance measuring means.

9. A surveying instrument as defined in claim 8, wherein the horizontal-distance measuring and the elevation measuring means are provided for correcting the effect of ascents and descents and obtaining true-distance measurements in correct datum-line values; said elevation measuring means including a tiltable mirror.

10. In a cable and reel operated surveying instrument, the combination of movable elevation measuring means independent of the cable and reel recording means, a variable gearing operated by the withdrawal of the cable from the reel and by the elevation measuring means, and an operative connection between the variable gearing and the recording means, the variable gearing including two elements one operated in accordance with the true length of cable withdrawn from the reel and one operated by the movement of the elevation measuring means, thereby to control the variable gearing so that the latter operates the recording means to record accurately the correct datum-line distances surveyed.

11. In a surveying instrument, the combination of true-distance measuring means, cable and reel mechanism for actuating said means, azimuth measuring means, elevation measuring means, horizontal-distance measuring means actuated by the true-distance measuring means and the elevation measuring means acting in conjunction, a first recording means operated by the horizontal-distance measuring means and the azimuth measuring means acting in conjunction, and a second recording means simultaneously operated by the true-distance measuring means and the elevation measuring means acting in conjunction.

12. A surveying instrument as defined in claim 11, wherein each recording means includes a record-carrying drum slidably and rotatably mounted and also includes a friction-wheel rotatable on its axis and rotatable about a diameter thereof thereby to impose rotational and axially sliding movements on the drum, there also being provided operative connections between the four measuring means and the two recording means, whereby, as to the first recording means, the horizontal-distance measuring means rotates the friction-wheel about its axis and the azimuth measuring means rotates the friction-wheel about a diameter thereof, and, simultaneously, as to the second measuring means, the true-distance measuring means rotates the friction-wheel about its axis and the elevation measuring means rotates the friction-wheel about a diameter thereof.

13. A surveying instrument as defined in claim 12, wherein each of the horizontal-distance and the true-distance measuring means includes a rotatable member, and between said two last mentioned means a pair of frictional rotating members are continuously cooperative, and separate operative connections are provided (a) between the horizontal-distance measuring means and the first recording means to rotate its friction wheel axially and (b) between the true-distance measuring means and the second recording means to rotate its friction wheel axially.

14. In a recording surveying instrument of the cable and reel actuated type, the combination of elevation measuring means operated independently of gravity, a first rotatable member operated by the elevation measuring means, a true-distance measuring means operated by withdrawal of the cable, a second rotatable member operated by the true-distance measuring means, and horizontal-distance measuring means including a third rotatable member operated by the true-distance measuring means and the elevation measuring means acting in conjunction, the true-distance measuring means and the horizontal distance measuring means being simultaneously operant, the third rotatable member being always in direct operative engagement with said first and second rotatable members.

15. A surveying instrument as defined in claim 6, wherein operative connections are provided between the measuring means and the recording means, said connections being entirely mechanical.

16. A surveying instrument as defined in claim 11, wherein operative connections are provided between the measuring means and the recording means, said connections being entirely mechanical.

17. A surveying instrument as defined in claim 12, wherein the true-distance measuring means, the horizontal-distance measuring means and the elevation measuring means are operatively interconnected, to this end there being provided a friction disc driven in accordance with the true-distance measurement, a second friction disc continuously driven by the first mentioned disc, and a connection between the elevation measuring means and said second disc operating to adjust said second disc relative to the first mentioned disc to vary the speed ratio between the two discs in accordance with the elevation measurement.

18. A surveying instrument as defined in claim 12, wherein the elevation measuring means is rotatable, wherein a device is provided for rotation therewith, and wherein such device carries two parts each forming an element of a different one of said operative connections.

19. A surveying instrument as defined in claim 12, wherein one of said operative connections includes a ratchet fixed to one of said friction-wheels, a pawl co-acting with the teeth of said ratchet, a cam rotated by a distance measuring means, and a mechanical operative connection between the measuring means last mentioned and the pawl.

20. A surveying instrument as defined in claim 19, wherein a rotatable support is provided for the friction-wheel last mentioned to permit said friction-wheel to be rotated about a diameter thereof, wherein said pawl is carried by a member pivoted to said support to swing in the plane of said friction-wheel, and wherein said mechanical operative connection includes a tappet operated at one end by said cam and working along the axis of rotation of said support.

21. A surveying instrument as defined in claim 11, wherein the elevation measuring means is a movable mirror.

Signed at New York in the county of New York and State of New York this 30th day of July A. D. 1920.

DIMITRI SENSAUD DE LAVAUD.